(12) United States Patent
Meijer et al.

(10) Patent No.: US 7,702,686 B2
(45) Date of Patent: Apr. 20, 2010

(54) RETRIEVING AND PERSISTING OBJECTS FROM/TO RELATIONAL DATABASES

(75) Inventors: Henricus Johannes Maria Meijer, Mercer Island, WA (US); Anders Hejlsberg, Seattle, WA (US); Dinesh Chandrakant Kulkarni, Sammamish, WA (US); Luca Bolognese, Redmond, WA (US); Matthew J. Warren, Redmond, WA (US); Peter A. Hallam, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 286 days.

(21) Appl. No.: 11/193,574

(22) Filed: Jul. 29, 2005

(65) Prior Publication Data

US 2007/0027906 A1    Feb. 1, 2007

(51) Int. Cl.
*G06F 7/00* (2006.01)
*G06F 17/00* (2006.01)
*G06F 15/16* (2006.01)
(52) U.S. Cl. .................. 707/763; 707/705; 707/758
(58) Field of Classification Search .......... 707/1, 707/6, 204, 100–103 Z; 382/181; 704/2; 705/7
See application file for complete search history.

(56) References Cited

U.S. PATENT DOCUMENTS

| | | | |
|---|---|---|---|
| 5,193,171 A | 3/1993 | Shinmura | |
| 5,500,881 A | 3/1996 | Levin et al. | |
| 5,504,885 A | 4/1996 | Alashqur | |
| 5,615,362 A | 3/1997 | Jensen et al. | |
| 5,664,180 A | 9/1997 | Halpert et al. | |
| 5,748,966 A | 5/1998 | Sato | |
| 5,761,493 A | 6/1998 | Blakeley et al. | |
| 5,897,622 A | 4/1999 | Blinn et al. | |
| 5,907,846 A * | 5/1999 | Berner et al. ........... 707/103 R |
| 5,937,402 A | 8/1999 | Pandit | |
| 5,937,409 A | 8/1999 | Wetherbee | |
| 6,016,497 A | 1/2000 | Suver | |
| 6,101,502 A | 8/2000 | Heubner et al. | |
| 6,148,296 A | 11/2000 | Tabbara | |
| 6,163,776 A | 12/2000 | Periwal | |
| 6,243,709 B1 * | 6/2001 | Tung ................ 707/103 R |
| 6,339,775 B1 | 1/2002 | Zamanian et al. | |
| 6,378,126 B2 | 4/2002 | Tang | |
| 6,470,354 B1 | 10/2002 | Aldridge et al. | |
| 6,567,819 B1 | 5/2003 | Cheng et al. | |
| 6,574,673 B1 | 6/2003 | Hari | |
| 6,615,323 B1 | 9/2003 | Petersen et al. | |
| 6,625,620 B1 | 9/2003 | Tagg | |

(Continued)

OTHER PUBLICATIONS

Vieira et al. "XVerter: Querying XML Data with OR-DBMS," AMD 2003, Nov. 7, 2003, 8 pages, New Orleans, Louisiana.

(Continued)

*Primary Examiner*—Cam Y Truong
*Assistant Examiner*—Cecile Vo
(74) *Attorney, Agent, or Firm*—Workman Nydegger

(57) ABSTRACT

Systems and methods that enable consistent navigation (for a database and memory environment) in object relational mapping. This typically ensures fidelity of object graph via restrictions on collections of persistent objects (e.g., entity sets, entity refs . . . ). Moreover, a tracking component can detect changes as they occur, and only a copy of the objects that have changed can be created, to optimize operation.

16 Claims, 11 Drawing Sheets

U.S. PATENT DOCUMENTS

| | | | |
|---|---|---|---|
| 6,690,981 | B1 | 2/2004 | Kawachi et al. |
| 6,857,118 | B2 | 2/2005 | Karr et al. |
| 6,985,912 | B2 | 1/2006 | Mullins et al. |
| 6,993,529 | B1 | 1/2006 | Basko et al. |
| 7,043,720 | B2 | 5/2006 | Kuzmin |
| 7,096,231 | B2 | 8/2006 | Rajak et al. |
| 7,103,590 | B1 | 9/2006 | Murthy et al. |
| 7,137,100 | B2 | 11/2006 | Iborra et al. |
| 7,185,016 | B1 | 2/2007 | Rasmussen |
| 7,197,747 | B2 | 3/2007 | Ishizaki et al. |
| 7,284,242 | B2 | 10/2007 | Vion-Dury |
| 7,289,997 | B1 | 10/2007 | Kita et al. |
| 7,290,018 | B2 * | 10/2007 | Muecklich et al. .......... 707/204 |
| 7,310,638 | B1 | 12/2007 | Blair |
| 2002/0194155 | A1 | 12/2002 | Aldridge et al. |
| 2003/0061244 | A1 | 3/2003 | Hirohata |
| 2003/0208505 | A1 | 11/2003 | Mullins et al. |
| 2004/0098384 | A1 | 5/2004 | Min et al. |
| 2004/0148592 | A1 | 7/2004 | Vion-Dury |
| 2004/0158549 | A1 * | 8/2004 | Matena et al. ................. 707/1 |
| 2004/0194057 | A1 | 9/2004 | Schulte et al. |
| 2004/0210828 | A1 | 10/2004 | Langer |
| 2004/0230584 | A1 | 11/2004 | Nouri |
| 2004/0243921 | A1 | 12/2004 | Carr et al. |
| 2004/0260691 | A1 | 12/2004 | Desai et al. |
| 2004/0268328 | A1 | 12/2004 | Plesko et al. |
| 2005/0027681 | A1 | 2/2005 | Bernstein et al. |
| 2005/0055336 | A1 | 3/2005 | Hui et al. |
| 2005/0138073 | A1 | 6/2005 | Zhou et al. |
| 2006/0179068 | A1 | 8/2006 | Warner et al. |
| 2006/0195476 | A1 | 8/2006 | Nori et al. |
| 2006/0200438 | A1 * | 9/2006 | Schloming ..................... 707/1 |
| 2006/0294059 | A1 | 12/2006 | Chamberlain et al. |
| 2007/0027906 | A1 | 2/2007 | Meijer et al. |
| 2007/0028222 | A1 | 2/2007 | Meijer |
| 2007/0028223 | A1 | 2/2007 | Meijer |
| 2007/0044083 | A1 | 2/2007 | Meijer |
| 2007/0067716 | A1 | 3/2007 | Jung et al. |

OTHER PUBLICATIONS

Bonifati et al. "Pushing Reactive Services to XML Repositories Using Active Rules," ACM 2001, May 1, 2001, 9 pages, Hong Kong.

Sundaresan et al. "Algorithms and Programming Models for Efficient Representation of XML for Internet Applications," ACM 2001, May 1, 2001, 10 pages, Hong Kong.

Abelson, et al., Structure and Interpretbn of Computer programs. The Rules of Evaluation [online], Cambridge, MA: The MIT Press. 1996 [retrieved on Jan. 30, 2007]. Retrieved from the Internet: CURL:http:llmitpress.mit.edu/sicp/full-text/sicp/book/node56. html>,(chapter 3.2.1).

Barcndrfgt, The Impact of the Lambda Calculus and Computer Science, The Bulletin of Symbolic Logic [online], Jun. 1997 [retrieved on Jan. 30, 2007] Retrieved from the Internet:<UPL;https://www.rncs.vuw.ac.nz/courses/C0MP432/2006T2/docs/BarLarnbda.pdf>.

International Search Report dated Mar. 1, 2007 for PCT Application Serial No. PCT/US 06/24567, 2 Pages.

U.S. Appl. No. 11/193,690, filed Jul. 29, 2005, Kulkarni, et al.

U.S. Appl. No. 11/193,573, filed Jul. 29, 2005, Warren, et al.

U.S. Appl. No. 11/193,787, filed Jul. 29, 2005, Meijer, et al.

U.S. Appl. No. 11/019,335, filed Dec. 21, 2004, Sonkin, et al.

Brigit Demuth, et al. OCL as a Specification Language for Business Rules in Database Applications. Springer Verlag Berlin, Heidelberg 2001.

J. A. Orenstein, et al. Assessing a Relational Database through an Object Oriented Interface (extended abstract) VLDB Conference 1995.

Thad Scheer, et al. Acceleration Your Object—Oriented Development. An Obectivity, Inc.White Paper. Lockheed-Martin Mission Systems 1999.

Timothy L. Eshelman. Standard Interface : An Object to Relational Mapping Interface to Relational Databases. TCL 2003/2004. At&T Corp.

International Search Report dated Nov. 14, 2007 for PCT Application Serial No. PCT/US06/25575, 2 Pages.

International Search Report dated Sep. 17, 2007 for PCT Application Serial No. PCT/US 06/24567, 3 Pages.

TH Heil, JE Smith. "Concurrent garbage collection using hardware-assisted profiling," Proceeding of the 2nd international symposium on Memory . . . , 200—prtal.acm.org.

C#: Overview of C# 3.0, Draft 2, Jul. 2005, 18 pages.

Gupta, et al. Semantic-Based Filtering: Logic Programming Killer App. Retrieved Jul. 30, 2007.

Jones, et al. A Pattern Language Implementation, 2004. Retrieved Jul. 30, 2007.

OA Dated Oct. 31, 2008 for U.S. Appl. No. 11/193,573, 22 pages.

OA Dated Sep. 12, 2008 for U.S. Appl. No. 11/193,690, 27 pages.

Schrettner, et al. Parallel Execution of Object Functional Queries. Proceedings of the Fourth Symposium on Programming Languages and Software Tools, Hungary, Jun. 9-10, 1995.

Urban, et al. An Object Oriented Query Object Interface to Relational Databases, IEEE, 1994.

Burton. .Net Common Language Runtime Unleashed, Chapter 14: Delegates and Events, Apr. 4, 2002, 3 pages. SAMS.

Functional Programming. J. Webster (ed). Wiley Encyclopedia of Electrical and Electronics Engineering, 1999. John Wiley and Sons, Inc., 13 pages.

OA Dated Dec. 12, 2008 for U.S. Appl. No. 11/193,565, 90 pages.

OA Dated Dec. 29, 2008 for U.S. Appl. No. 11/193,566, 24 pages.

OA Dated Mar. 18, 2009 for U.S. Appl. No. 11/193,690, 24 pages.

Appel, Andrew W. "A Standard ML Compiler." IN Functional Programming Languages and Computer Architecture. 1987. Springer-Verlag pp. 301-324 Retrieved from http://citeseerx.ist.psu.edu/viewdoc/download;
jsessionid=52E0B629682496E5BAD2886354FCBDB6?doi=1031.1.35.571&rep=rep1&type=pdf on Apr. 21, 2009.

Jarvi, Jaakko, Gary Powell and Andrew Lumsdaine. "The Lambda Library: unnamed functions in C++" Software—Practice and Experience, 2003. vol. 33, pp. 259-291. Retrieved from http://portal.acm.org/citation.cfm?id=779144 on Sep. 9, 2009.

"McNamara, Brian and Yannis Smaragdakis." "Functional Programming in C++" "Proceedings of the fifth ACM SIGPLAN international conference on Functional programming, 2000. pp. 118-129. Retrieved from http://portal.acm.org/citation.cfm?id=351251 on Sep. 9, 2009."

Willcock, Jeremiah, Jaakko Jarvi, Doug Gregor, Bjarne Stroustrup, and Andrew Lumsdaine. "Lambda expressions and closures for C++." Feb. 26, 2006, ISO WG21 The C++ Standards Committee, Document No: N1968=06-0038. pp. 1-14. Retrieved from http://www.open-std.org/JTC1/SC22/WG21/docs/papers/2006/n1968.pdf on Sep. 8, 2009.

SGI. "find-it" Jun. 8, 2000 Release 3.3 Standard Template Library, SGI.

Gregor, Douglas, Jaakko Jarvi, Mayuresh Kulkarni, Andrew Lumsdaine, David Musser, and Sibylle Schupp. "Generic Programming and High-Performance Libraries." Jun. 2005, International Journal of Parallel programming, vol. 33, No. 2, pp. 1-21. Retrieved from http://faculty.cs.tamu.edu/jarvi/publications/Keyword/GENERIC-PROGRAMMING.html on Sep. 10, 2009.

Lischner, Ray. "C++ In a Nutshell, 1st Edition" Sections 3.1 "L-values and R-values" and 5.3 "Function Overloading."

Office Action dated Jul. 17, 2009 cited in U.S. Appl. No. 11/193,566.

Office Action dated May 4, 2009 cited in U.S. Appl. No. 11/193,565.

Office Action dated Sep. 28, 2009 cited in U.S. Appl. No. 11/193,565.

Office Action dated Jan. 14, 2008 cited in U.S. Appl. No. 11/193,690.

Notice of Allowance dated Sep. 17, 2009 cited in Application No. 11/193,690.

Office Action dated Aug. 2, 2007 cited in U.S. Appl. No. 11/193,573.

Office Action dated Nov. 29, 2007 cited in U.S. Appl. No. 11/193,573.

Office Action dated Apr. 29, 2008 cited in U.S. Appl. No. 11/193,573.

Office Action dated Jun. 8, 2009 cited in U.S. Appl. No. 11/193,573.

Office Action dated Dec. 29, 2008 cited in U.S. Appl. No. 11/193,721.

Office Action dated Jun. 9, 2009 cited in U.S. Appl. No. 11/193,721.

* cited by examiner

RETRIEVING AND PERSISTING OBJECTS FROM/TO RELATIONAL DATABASES

CROSS-REFERENCE TO RELATED APPLICATIONS

This application is related to U.S. patent application Ser. No. 11/193,690, filed Jul. 29, 2005, entitled CODE GENERATION PATTERNS, and U.S. patent application Ser. No. 11/193,573, filed Jul. 29, 2005, entitled INTELLIGENT SQL GENERATION FOR PERSISTENT OBJECT RETRIEVAL. The entireties of these applications are incorporated herein by reference.

BACKGROUND

As the strategic value of software increases for many companies, software vendors continually seek out new techniques to automate the production of software and to improve quality and reduce cost and time-to-market. These techniques include component technology, visual programming, patterns and frameworks. As the complexity of software systems increase in scope and scale, companies seek techniques to manage and solve such complexities, which include recurring architectural problems, such as physical distribution, fault tolerance, replication, security, concurrency and load balancing. Additionally, the development for the Internet, while making some communications exchanges much simpler, exacerbates these architectural challenges.

In particular, one common software architectural representation is a class diagram. A class diagram presents a graphic presentation which describes the static structure of the symbols in a system, and shows a collection of declarative (static) model elements, such as classes, types, and their contents and relationships. Classes are arranged in hierarchies that share a common structure and behavior, and are associated with other classes. Class diagrams model class structure and contents using design elements such as classes, packages and objects, and also display relationships such as containment, inheritance, associations and others. A class, in the jargon of object-oriented programming, is an element that defines the structure and behavior of a set of objects in an object-oriented program. In an object-oriented application, classes have attributes (member variables), operations (member functions) and relationships with other classes.

Moreover, code generation has become popular in the context of object-relational mapping (ORM). Relational data storage systems (e.g., DB2, SQL Server, MySQL, and the like) are commonly employed to store relational data and manage associated relationships. It is desirable for software developed in source-level languages to access and manipulate the relational data stored in the relational data storage system. When the application software is managing the relational data, it is also desirable to maintain the relationships inherent in the data. In addition, any changes or modifications to the relational data should be persisted back the relational data storage system.

In general, object-oriented languages do not provide software developers with tools to manage relational data and ensure consistency of relationships. For example, when data for a one-to-many relationship such as the customer order relationship is mapped using object oriented source code, it is frequently mapped without such features. Accordingly, when objects are populated with relational data, it is typically the responsibility of the programmer to ensure that the objects are consistent with the relational data. Similarly, when an object such as an order is removed, the programmer is responsible for ensuring that all the relevant relationships are updated. If an Order is deleted, such Order must be removed from the list of orders for the related Customer.

Additionally, once data is retrieved from the Database and converted to objects, then the data access layer can lose its ability to track a change, and two separate environments, namely: the database and the memory can be considered. In the database environment rows and columns are employed and a value provides access to desired objects. In contrast, in a memory environment pointers can be typically employed and in general no value matching or comparison is performed for object identification.

Inconsistencies can occur in such environments between the database and the memory, for example during debugging operations or when objects are modified, deleted or inserted. Errors can then be triggered, to refuse persistence of data in the database. Moreover, the ordering of the issued sequel commands can further add to the complexities involved in the object relational mapping.

Furthermore, inefficiencies exist in operation of object relational mapping systems. For example, when a programmer's code induces changes in objects within a memory, an object is initially brought into memory and a copy maintained therein. Such copy can be preserved to provide for a later comparison when a persist operation is required. Creating such copies for all loaded objects can consume resources associated with the computing infrastructure.

SUMMARY

The following presents a simplified summary of the innovation in order to provide a basic understanding of some aspects thereof. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The subject innovation provides for systems and methods of object relational mapping that enables navigation in a consistent manner (for the database and memory environment) and typically ensures fidelity of object graph via restrictions on collections of persistent objects (entity sets, entity refs). Accordingly, a prescriptive programming model is provided, wherein employing a specific collection class for an entity set by a user, can typically ensure fidelity of object graph in the memory side, such as by supplying pointers that are bi-directionally consistent. For example, a class division of employees can be supplied (an entity set) such that when a user employs such special object, and an employee is added, an employee division property can point back to such division, to prevent an inconsistency. As such built relationships can be maintained during Create, Read, Update and Delete (CRUD) operations, during a life cycle of an object. Moreover, since objects in memory exist in a heap, tables for interesting objects can be provided to supply knowledge for roots to the infrastructure. Such table of interesting objects can mitigate a requirement to recursively walk a corresponding graph. The pointers for entity sets and entity refs are bi-directionally consistent to properly maintain fidelity among object relationships. Modifications of objects in memory can then be pushed back up to the database side.

According to a methodology of the subject innovation, objects are first loaded into memory, followed by a modification performed thereon. Such modifications can include an update, insert or delete. For example, a division having two employees that work therein can be loaded into memory.

Subsequently, an employee can be deleted, or another employee added to such division, with the changes persisted back into the database. When an employee is to be deleted such deletion can be explicitly indicated.

In a related aspect, object fidelity can be supplied by enforcing two constraints, namely maintaining object identity and ensuring fidelity of entity collections that are part of a retrieved entity. In general, on the database side object identity can be maintained via primary key, wherein two items can be considered the same if they point to the same memory location and reference equality is maintained. When a same row is retrieved twice (e.g., via different parts of a query) they are represented by the same object (e.g., identity map). Maintaining object identity can be accomplished by maintaining the primary key (or unique key) value corresponding to the entity, and in general ensuring that there is no more than one object for the given identification (id) value.

Likewise, for ensuring fidelity of entity collections that are a part of a retrieved entity, for a given entity all related entities should typically be virtually accessible (e.g., navigation of entity refs, and entity sets). Moreover, the subject innovation can provide for a lazy loading and/or eager loading into the memory. For example, in case of a division having two employees that work therein, the division can be loaded without the two employees (lazy loading), or what can be reached through the division is also loaded into memory (eager loading).

According to a further aspect of the subject innovation, a tracking component can detect changes as they occur, and only a copy of the objects that have changed can be created. Such can provide an optimization algorithm to optimize a space and time required for detecting changes to objects and maintaining original values. Additionally, the corresponding comparison work can be significantly reduced.

In a related aspect, every object in the table of interesting objects has a state. When an object is added, the tracking component can observe all related items, and when an object is marked for deletion all related children will also be automatically deleted. Moreover, a notification can be supplied when an object is to be changed, and a copy of the unchanged state can be saved, for a later comparison with the changed version. As such, system resources can be efficiently used. Also a programmer can be given the option of using the code generation tools with the prescriptive framework and obtain such benefit of optimization, or alternatively write classes as desired an forfeit such optimization.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
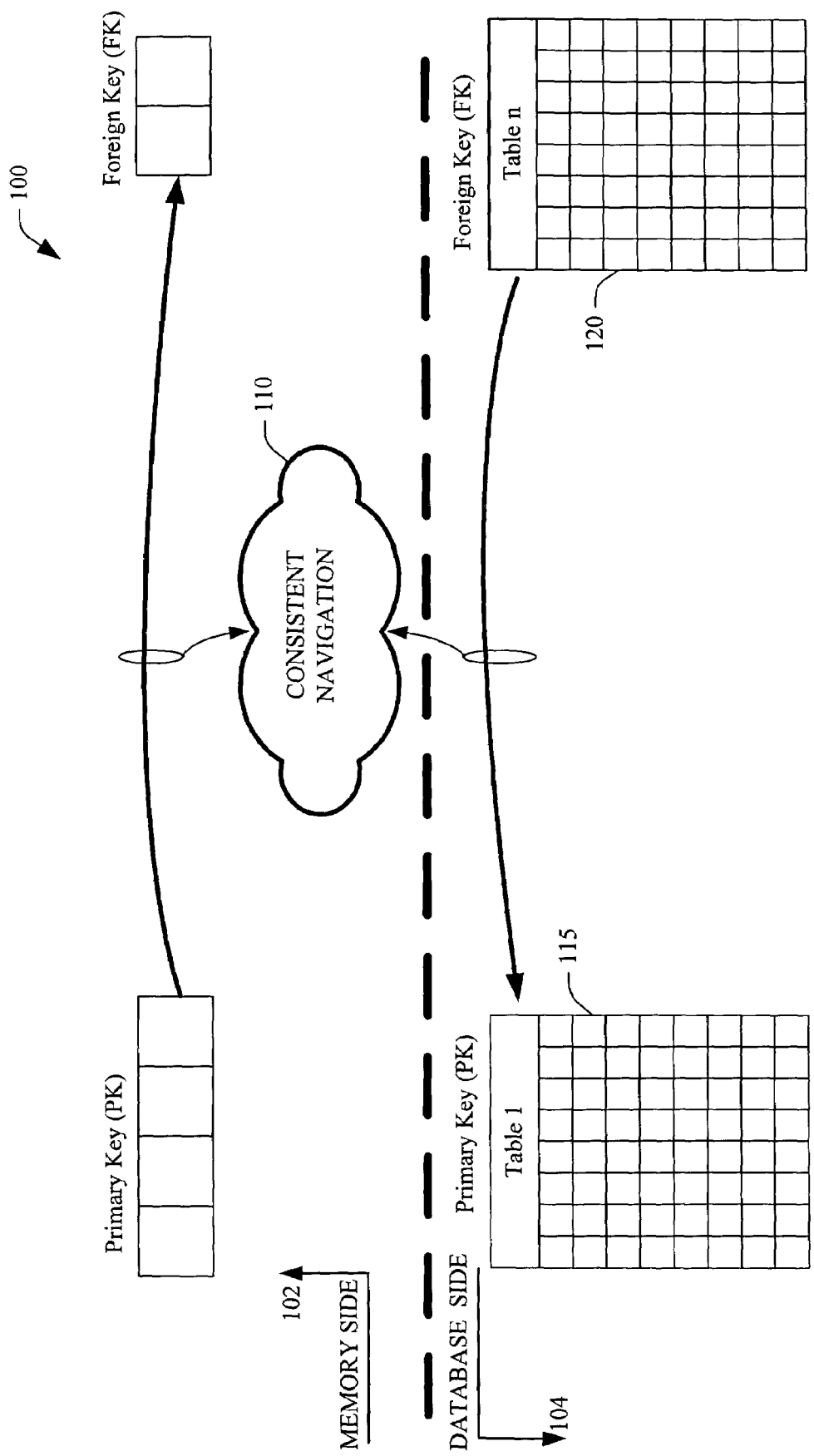
FIG. 1 illustrates a schematic diagram that shows the relationship between the database side and memory side, for an object relational mapping system.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation can be practiced without these specific details. In other instances, well-known structures and devices are shown in block diagram form in order to facilitate describing the subject innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

FIG. 1 illustrates a schematic diagram that shows the relationship between the memory side 102 and database side 104, in an object relational mapping system 100. For example, on the database side 104, a customer and order list can be represented as tables 115 and 120, wherein existing relationships can be in form of a primary key (PK)—foreign key (FK), with pointers from the FK to the PK—(the foreign key can be a column or combination of columns used to establish and enforce a link between the data of a source table and a target table.)

On the other hand, when the customer and order list are moved to memory, typically natural forms of expression between customers and orders are to maintain collection of orders. Accordingly, instead of having an order that points to the customer, such customer has a collection of orders. Moreover, pointers are from the PK to the FK, and at a different direction when compared to the database side.

On the memory side 102 objects can exist on a heap, and the consistent navigation feature 110 of the subject innovation enables updates performed on the memory side 102 to reflect and be pushed back on the relational database side 104, despite the fact that the navigational links in the relational side 104 are typically from foreign key to primary key, and in the opposite direction of the memory side 102. Such enables navigation in a consistent manner (for the database and memory environment), and typically ensures fidelity of object graph via restrictions on collections of persistent objects (entity sets, entity refs). Accordingly, a prescriptive programming model is provided, wherein employing a specific collection class for an entity set by a user, can typically ensure fidelity of object graph in the memory side, such as by supplying pointers that are bi-directionally consistent.

Figure 2:
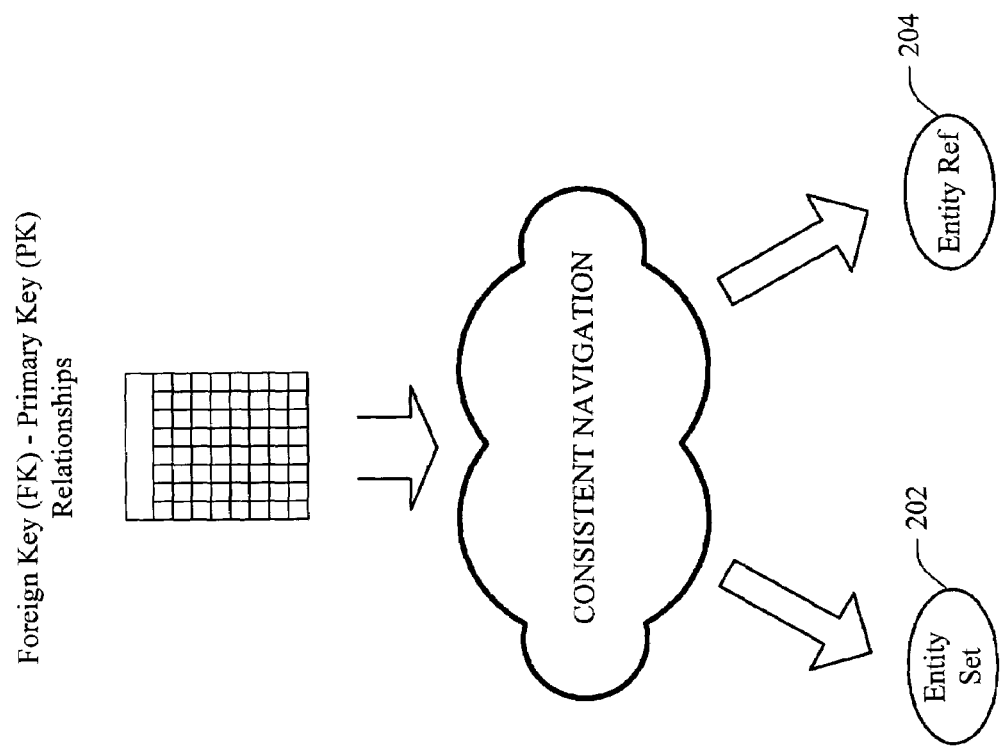
FIG. 2 illustrates implementation of the consistent navigation via entity set and entity refs, which are components that maintain fidelity for the underlying relationship, being formed from the primary key foreign key relationships.

FIG. 2 illustrates generation of specified entity sets 202 and entity refs 204 which are components that maintain fidelity for the underlying relationship. Such entity sets and entity refs facilitate bi-directional navigation in the memory side, and provide consistency between the memory side and the database side. Classes that correspond to tables can be generated by employing the entity sets 202 and entity refs 204.

Object Relational Mapping

Figure 3:
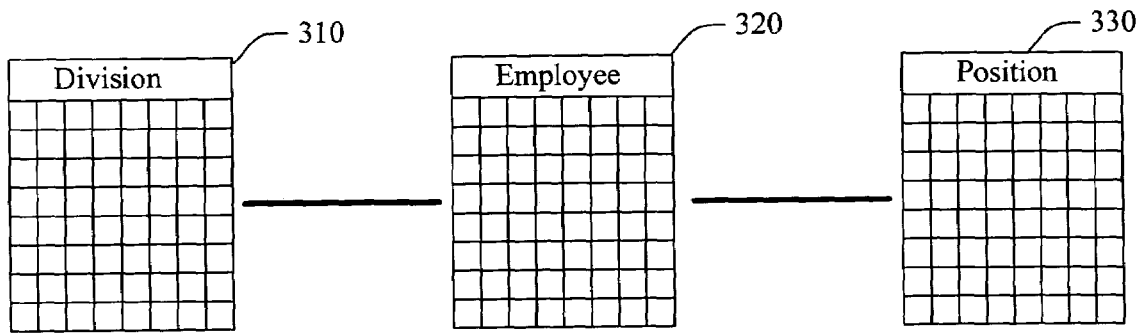
FIG. 3 illustrates a schematic diagram for a zero to many employee relationship, and a zero or one position related to an employee for a three class model.

In general, object-relational mapping (ORM) allows a class to be mapped to a table or a view composed of one or more tables. The view can be defined in the database or through a mapping artifact such as a mapping file or source code attributes. There can exist relationships between classes modeled as object references or collections of references. FIG. 3 illustrates an exemplary model with three classes Division 310, Employee 320 and Position 330 that are related to each other, as described in detail infra. As such, there can exist zero-to-many employees in a division (example of a 1:n relationship) and zero-or-one position related to an Employee (example of a 1:1 relationship).

By implementing the entity refs and the entity sets, a bi-directional relationship between division and employee can be created. In the object world, the entity set can collect all employees that point to the respective division. For example:

```
create table DivisionTable (
    DivId integer identity,
    DivName      varchar(100),
    CONSTRAINT PK_DivisionTable PRIMARY KEY (DivId)
)
create table EmployeeTable (
    EmpId integer identity,
    DivId integer not null,
    EmpName      varchar(100),
    StartDate DateTime not null,
    CONSTRAINT PK_EmployeeTable PRIMARY KEY (EmpId),
    CONSTRAINT FK_EmployeeDivision FOREIGN KEY (DivId)
references DivisionTable(DivId)
)
create table PositionTable (
    PosId integer identity,
    EmpId integer not null,
```

```
    PosName      varchar(100),
    Level integer not null,
    CONSTRAINT PK_PositionTable PRIMARY KEY (PosId),
    CONSTRAINT FK_PositionEmployee FOREIGN KEY (EmpId)
references EmployeeTable(EmpId)
)
```

An outline of the corresponding classes can be described as:

```
class Division
{
    private int id;
    private string name;
    private EntitySet<Employee> employees;
    public int DivId
    {
        get { return id; }
        set { id = value; }
    }
    public string DivName
    {
        get { return name; }
        set { name = value; }
    }
    public EntitySet<Employee> Employees
    {
        // code for managing relationship with Employee
instances
    }
}
```

Division Id can act as the foreign key and the DivisonTable as the primary key.

```
class Employee
{
    private int id;
    private string name;
    private EntityRef<Division> division;
    private EntityRef<Position> position;
    public int EmpId
    {
        get { return id; }
        set { id = value; }
    }
    public string EmpName
    {
        get { return name; }
        set { name = value; }
    }
    public EntityRef<Division> Division
    {
        // code for managing relationship with Division
instance
    }
    public EntityRef<Position> Position
    {
        // code for managing relationship with Position
instance
    }
}
```

Entityset collects all employees that belong to a division. Accordingly, when mapping between the relational world and the object world is performed, the bi-directional navigation between division and employee utilizes the Entityset and Entityref data object components.

```
class Position
{
    private int id;
    private string name;
    private EntityRef<Employee> employee;
    public int PosId
    {
        get { return id; }
        set { id = value; }
    }
    public string PosName
    {
        get { return name; }
        set { name = value; }
    }
    public EntityRef<Employee> Employee
    {
        // code for managing relationship with Employee
        instance
    }
}
```

Figure 4:
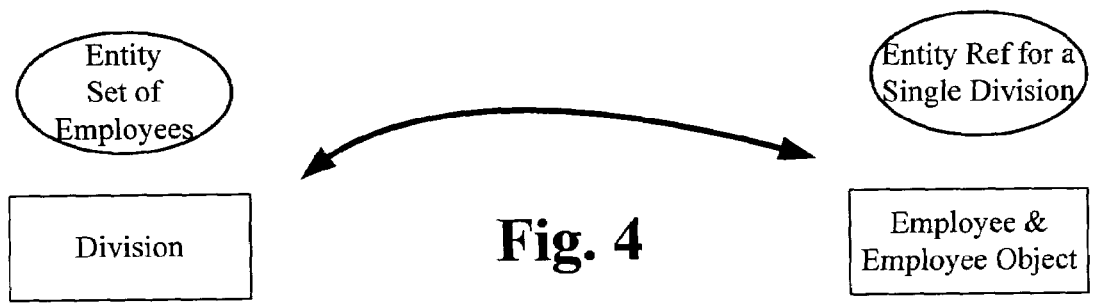
FIG. 4 illustrates a bi-directional navigation between an entity set of employees and an entity ref for a single division.
Figure 5:
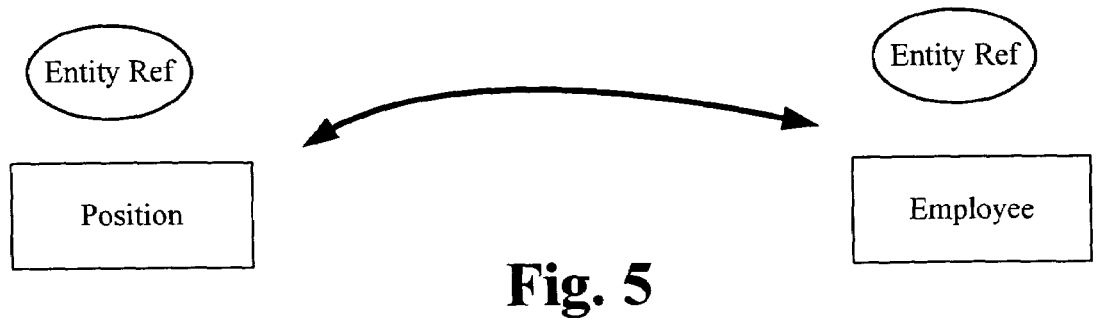
FIG. 5 illustrates a further bi-directional navigation between an entity set of a position and an entity ref for an employee.

FIG. 4 and FIG. 5 illustrate maintaining the bi-directional consistency, between division and employee, and between employee and position. As described above, the sets or containers can be implemented as generic classes that can be instantiated for different types of objects, wherein a set includes an aggregate of a set of objects (e.g., a set of orders). Moreover, the sets can either include a set of object(s) being referred to as entity sets, or the set can include a reference to an object (e.g., customer name for an order)—entity refs. A pair of entity refs can be employed to model a one-to-one relationship. The combination of entity refs and entity sets can be used to model the one-to-many relationship.

Figure 6:
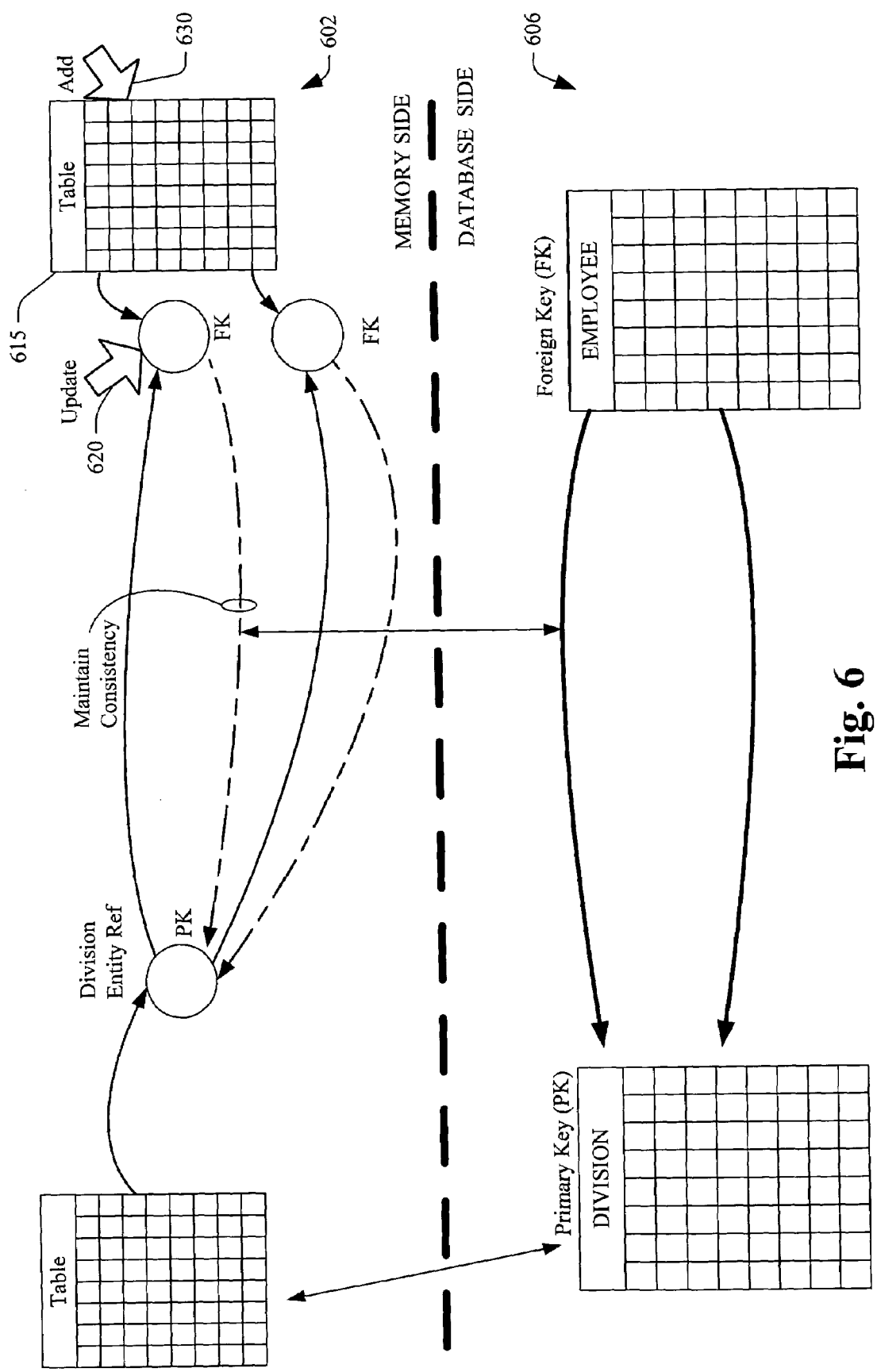
FIG. 6 illustrates a schematic diagram that illustrates the relationship between the database side and memory side, wherein entity sets and entity refs supply object fidelity.

Accordingly and as illustrated in FIG. 6, a prescriptive programming model is provided, wherein employing a specific collection class for an entity set by a user, can typically ensure fidelity of object graph in the memory side 602, such as by supplying pointers that are bi-directionally consistent. For example, a class division of employees can be supplied (an entity set) such that when a user employs such special object, and an employee is added at 630, an employee division property can point back to such division, to prevent an inconsistency. As such built relationships can be maintained during Create, Read, Update and Delete (CRUD) operations, during a life cycle of an object. Moreover, since objects in memory exist in a heap, tables 615 for interesting objects can supply knowledge for roots to the infrastructure Such table of interesting objects can mitigate a requirement to recursively walk an a corresponding graph. The pointers for entity sets and entity refs are bi-directionally consistent to properly maintain fidelity among object relationships. Modifications of objects in memory can then be pushed back up to the database side 606.

Object Graph Fidelity with Data in Relational Database

Typically, sequence operators allow queries over mapped objects. A query can specify predicates for filtering a set of objects. For example, a division object with a certain DivId value can be loaded. Once an object is loaded, it is important to maintain its fidelity with the persistent representation—subject to the specified mapping. Fidelity assurance allows code to be written against the object graph reachable from a given object without regard to specific query used for retrieving that object. It also ensures that the object is updatable with a consistent semantics. Such an updatable persistent object is called an entity.

Two constraints can be typically enforced to ensure fidelity:

1. Maintaining object identity: as in case of most object-relational frameworks, such can be accomplished by maintaining the primary key (or unique key) value corresponding to the entity and ensuring that there is no more than one object for the given id value (at most one object reference for a given id value); and 2. Ensuring fidelity of entity collections that are a part of a retrieved entity. From a given entity, all related entities in general should be virtually accessible. It is to be appreciated that such does not require that all the related entities be loaded at any given point in time, but simply that they remain accessible. According to an aspect of the subject innovation, this is a new mechanism added to traditional ORM mechanism of object identity.

The second constraint is enforced by requiring an EntitySet on the 1-side of the 1:n relationship. An EntitySet typically ensures that; first, when a corresponding relationship is navigated (as in the code below) the EntitySet loads its contents if such are not already loaded. The contents correspond to the set of all target rows in the database. Hence, when the EntitySet div1.Employees is loaded, all Employees corresponding to the Division div1 that are present in the database can be loaded.

```
Division div1 = ...;
    foreach (Employee e in div1.Employees) ...
```

Second, an EntitySet ensures that an exception is considered indicating failure, should the target entities fail to load. Third, the EntitySet is typically never partially loaded. (Any partial loading will cause the object to be treated as a read-only, non-Entity object and hence non-updatable by the ORM implementation. A developer is free to use partial collections subject to this stipulation).

Thus, EntitySet ensures object graph fidelity. For example, given a Division entity, e.g., div1, it ensures that div1.Employees, in general will never deviate from the set of employees for that division in the database at the time of retrieval of the employees. The EntitySet mechanism can be consistently used for lazy loading (on-demand loading), and also for eager loading (pre-fetching). The two loading strategies have different space-time tradeoffs and are suitable for different change profile of data. The subject innovation provides support for both loading types without compromising fidelity. Likewise, EntityRef provides lazy loading capability for singleton reference in n-side of 1:n relationship (Employee.Division) and both the sides of 1:1 relationship (Employee.Position and Position.Employee).

Lazy loading is in general most appropriate for:
1. Data that does not change frequently or applications that can tolerate parts of object graph that are loaded at different times based on navigation
2. Minimizing the amount of data loaded—an EntitySet is loaded in general only when accessed; not otherwise Eager loading is in general most appropriate for:
1. Ensuring consistent snapshot of data (e.g., Division and Employees are loaded together).
2. Minimizing the latency of navigation—an EntitySet is pre-loaded and hence when it is accessed, the latency of database roundtrip is not incurred.

EntitySet typically ensures fidelity in case of lazy loading by loading the entire collection. Any failure is reported as an exception. Likewise, in case of eager loading, the entire EntitySet is loaded. It is also possible to use a combination of the two loading capabilities for different relationships in an object graph. For example, Division.Employees can be eager loaded while Employee.Position could be lazy loaded.

The EntitySet restriction and its semantics in case of lazy and eager loading cover object retrieval. The next fidelity assurance mechanism handles changes to retrieved entities and creation of new entities for eventual insertion into database. It handles the divide between object graphs constructed out of unidirectional references and the underlying value-based foreign key constraints which are inherently bidirectional.

In general, a given foreign-key relationship in the database can be mapped to classes in one of three possible ways, namely:

1. Bidirectional references between related classes (e.g., Division-Employee or Employee-Position object model described supra.)
2. Unidirectional reference from the class mapped to a table containing the corresponding foreign key (e.g., Employee.Division is present in the object model but Division.Employees is not.)
3. Unidirectional reference from the class mapped to a table containing the corresponding parent key (e.g., Division.Employees is present in the object model but Employee.Division is not.)

In each case, the reference(s) may be public or private or explicit in the object model or implemented under the cover by the ORM implementation.

Whenever a relationship is changed in the object graph, the corresponding change must be persisted in the table containing the foreign keys. For example, if an Employee emp1 is transferred from Division div1 to Division div2, the first two cases above can be easily translated into foreign key change for emp1. In the third case, a search may be required to find out if an Employee row needs to be updated in the database.

Figure 7:
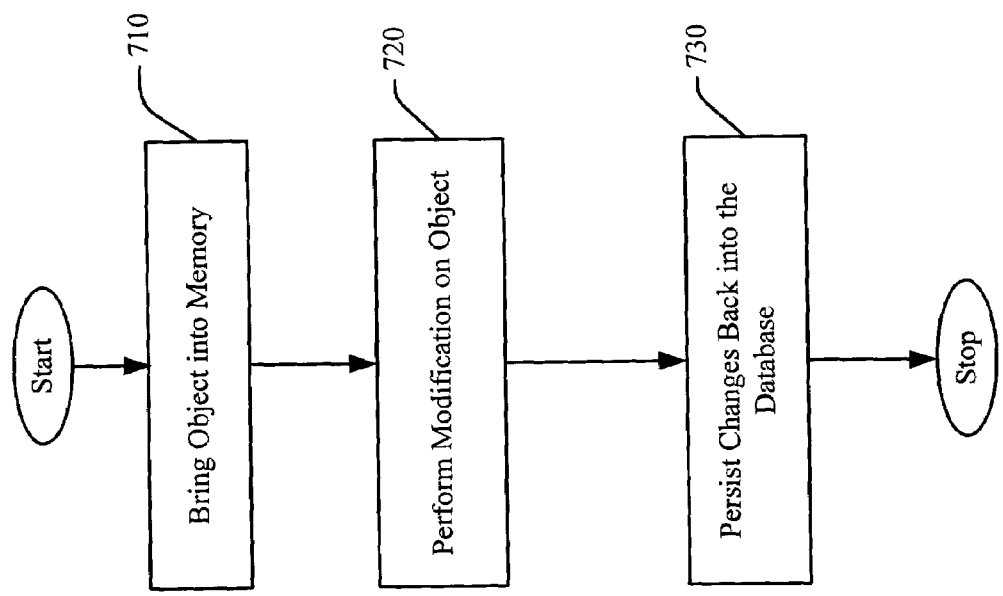
FIG. 7 illustrates an exemplary methodology of modifying the database in accordance with an aspect of the subject innovation.

FIG. 7 illustrates an exemplary methodology of modifying the database in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 710, objects are first brought into memory for a modification to be performed thereon. This can be followed by a modification performed on the object, at 720. Such modifications can for example include and update, delete, as will be described in detail infra. For example, a division having two employees that work therein can be loaded into memory. An employee can be modified, deleted, or another employee added to such division. Thereafter, changes persisted back into the database at 730. When an employee is to be deleted such can be explicitly indicated.

Figure 8:
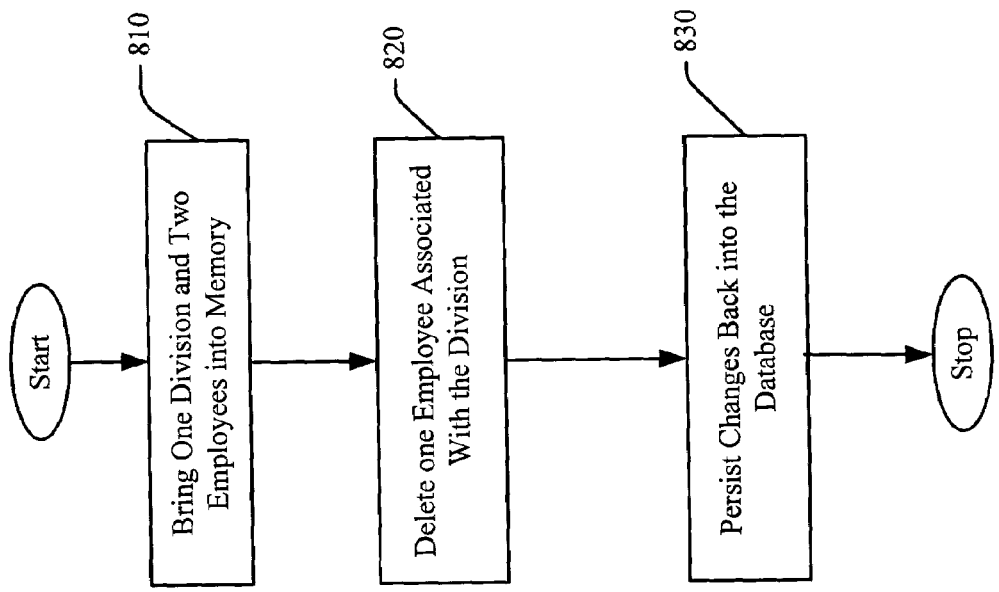
FIG. 8 illustrates an exemplary methodology of deleting an object in accordance with an aspect of the subject innovation.

FIG. 8 illustrates a related methodology for deleting an object. Initially and at 810, three objects that consist of one division and two employees associated with the division are retrieved into memory. One of the employees can then be deleted at 820. Such deletion can then be persisted into the database at 830. Such deletion can be explicitly indicated, for example:

```
Read 1 div (D1) + 2 employees (E1, E2)
Delete E2
Persist changes
Division d1 = db.Divisions.Where(d => d.Id =
1).Element( ).Including(d => d.Employees)      // retrieves
division with id of 1 and its employees (assume two employees)
Employee e2 = d1.Employees[1];    // Second employee in the
EntitySet Employees
D1.Employees.Remove(e2);          // Only one way ref needs
to be set - the other direction is automatically taken care of
db.Employees.Remove(e2);          // Employee marked for
deletion
db.PersistChanges( );             // Data saved to database
- deletion effected in database
```

Figure 9:
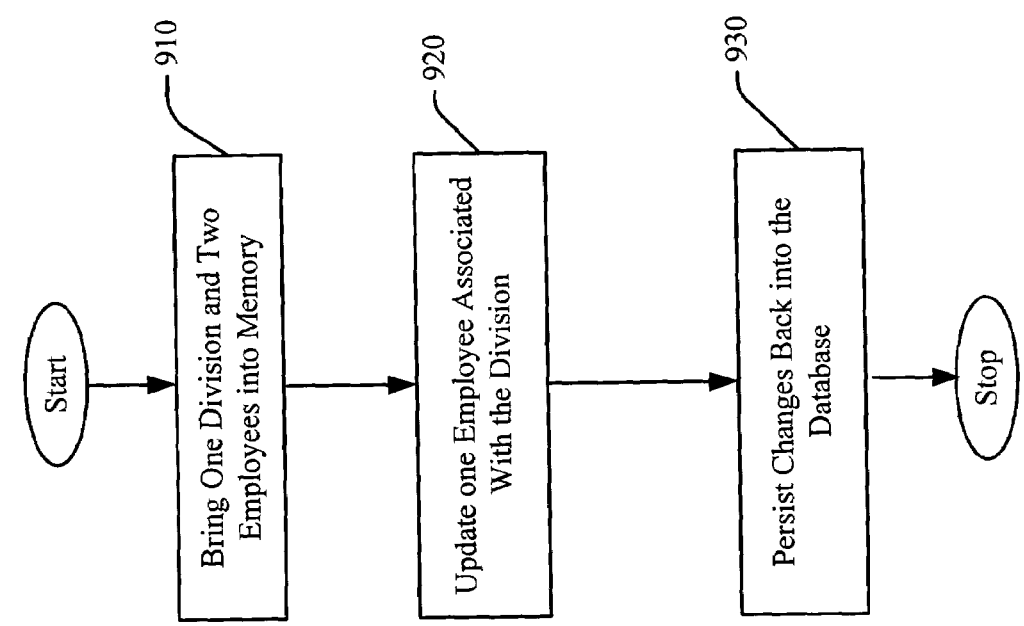
FIG. 9 illustrates an exemplary methodology of updating an object in accordance with an aspect of the subject innovation.

Likewise, FIG. 9 illustrates a related methodology for updating an object. Initially and at 910, three objects that consist of one division and two employees associated with the division are retrieved into memory. One of the employees can then be updated at 920. Such modification can then be persisted into the database at 930. Such deletion can be explicitly indicated, for example:

```
Read 1 div (D1) + 2 employees (E1, E2)
Update E1
Persist changes
Division d1 = db.Divisions.Where(d => d.Id =
1).Element( ).Including(d => d.Employees)      // retrieves
division with id of 1 and its employees (assume two employees)
Employee e1 = d1.Employees[0];    // First employee in the
EntitySet Employees
e1. name = ....;                  // change the name - change only in
memory
db.PersistChanges( );  // Data saved to database - update
effected in database
```

Alternatively, the more explicit expression of db.Employees.TrackChanges(e1); can also be employed.

Figure 10:
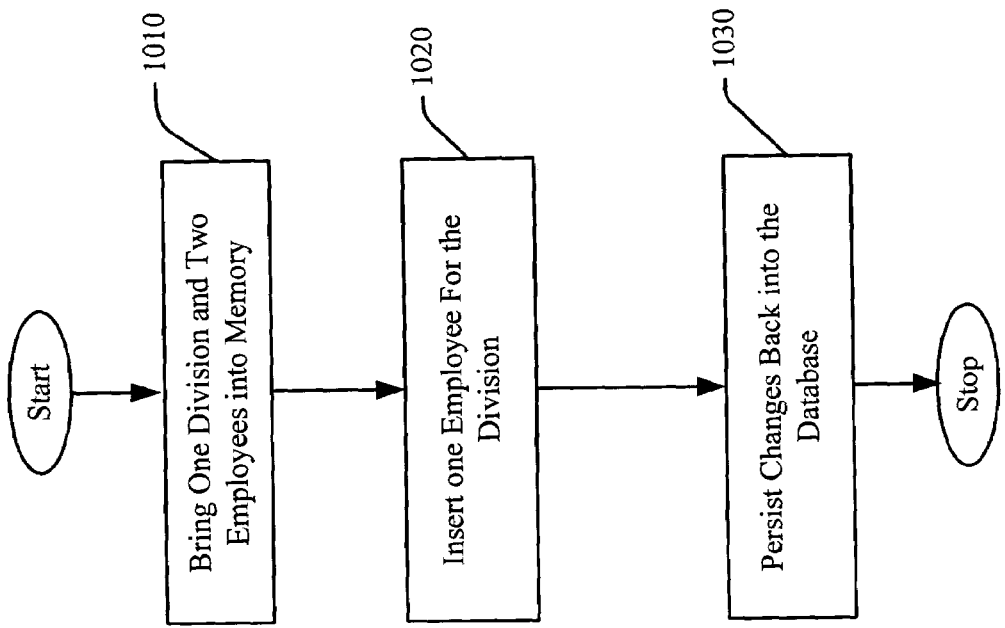
FIG. 10 illustrates an exemplary methodology of inserting an object in accordance with an aspect of the subject innovation.

Similarly, FIG. 10 illustrates a related methodology for inserting an object. Initially and at 1010, three objects that consist of one division and two employees associated with the division are retrieved into memory. One new employees can then be added at 1020. Such modification can then be persisted into the database at 1030. Such deletion can be explicitly indicated, for example:

```
Read 1 div (D1) + 2 employees (E1, E2)
Insert E3
Persist changes
Division d1 = db.Divisions.Where(d => d.Id =
1).Element( ).Including(d => d.Employees)      // retrieves
division with id of 1 and its employees (assume two employees)
Employee e3 = new Employee(...);  // New employee object
created
e3.Division = d1;                 // Only one way ref needs
to be set - the other direction is automatically taken care of
db.Employees.Add(e3);             // Employee marked for
addition
db.PersistChanges( );             // Data saved to database
- insertion effected in database
```

In a related aspect, every object in the table of interesting objects of the memory side has a state. When an object is added a tracking component can observe all related items, and when an object is marked for deletion all related children will also be automatically deleted. Moreover, a notification can be supplied when an object is changed, and a copy of the unchanged state can be saved, for a later comparison thereof with the changed version.

Optimal Change Detection and Original Value Tracking

Figure 11:
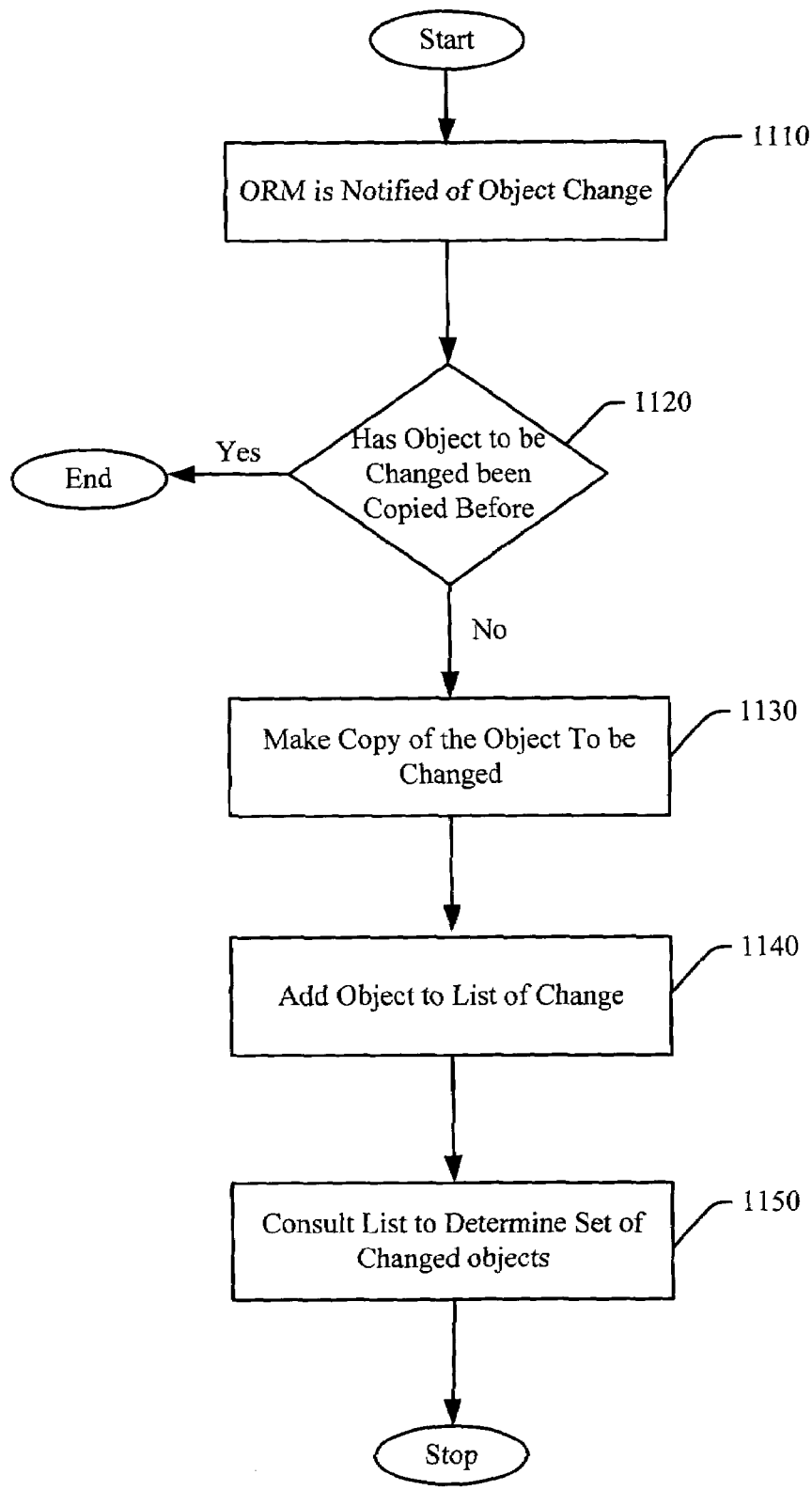
FIG. 11 illustrates a flow chart for optimal change tracking in accordance with an aspect of the subject innovation.

FIG. 11 illustrates a flow chart for optimal change tracking in accordance with an aspect of the subject innovation. Initially and at 1110, when a property setter is invoked, generated code calls the ORM implementation to notify that the object is about to change. In response and at 1120, the object persistence infrastructure checks if the object to be changed has been copied before. If not, at 1130 the object persistence infrastructure makes a copy of the object and adds it to the list of objects to be checked for changes at 1140. Subsequently and at 1150, when the API to persist changes is called, the list of modified objects is consulted for determining the set of changed objects (e.g., the "change set").

Typically, previous ORM implementations have often relied on making copies of objects upon retrieval. Such copy allows for record keeping of original values for optimistic concurrency, and change detection when an API to persist objects is called. The persistence infrastructure of the subject innovation, instead utilizes the notification mechanism injected into setters during code generation, for example: objects that are not modified are not copied. This can in general result in substantial space and time savings while ensuring original values necessary for optimistic concurrency. Moreover, when API to persist changes is called, a comparison of original and current copies of an object ("sameness" based on object identity) is unnecessary for change detection. A list of changed objects is accumulated over time due to notifications. Such can further results in substantial time saving in change detection.

Accordingly, the object persistence infrastructure of the subject innovation provides an optimal implementation for generated code with notification mechanism. Nonetheless, it also provides a suboptimal and equally functional default for object model that does not provide notifications (e.g. classes written by developer instead of being generated by the subject innovation). The infrastructure detects the absence of notification mechanism and proactively makes a copy for optimistic concurrency and change detection. Hence, a programmer can be given the option of using the code generation tools with the prescriptive framework and obtain such benefit of optimization, or alternatively write classes as desired an forfeit such optimization. As such, system resources can be efficiently used.

Figure 12:
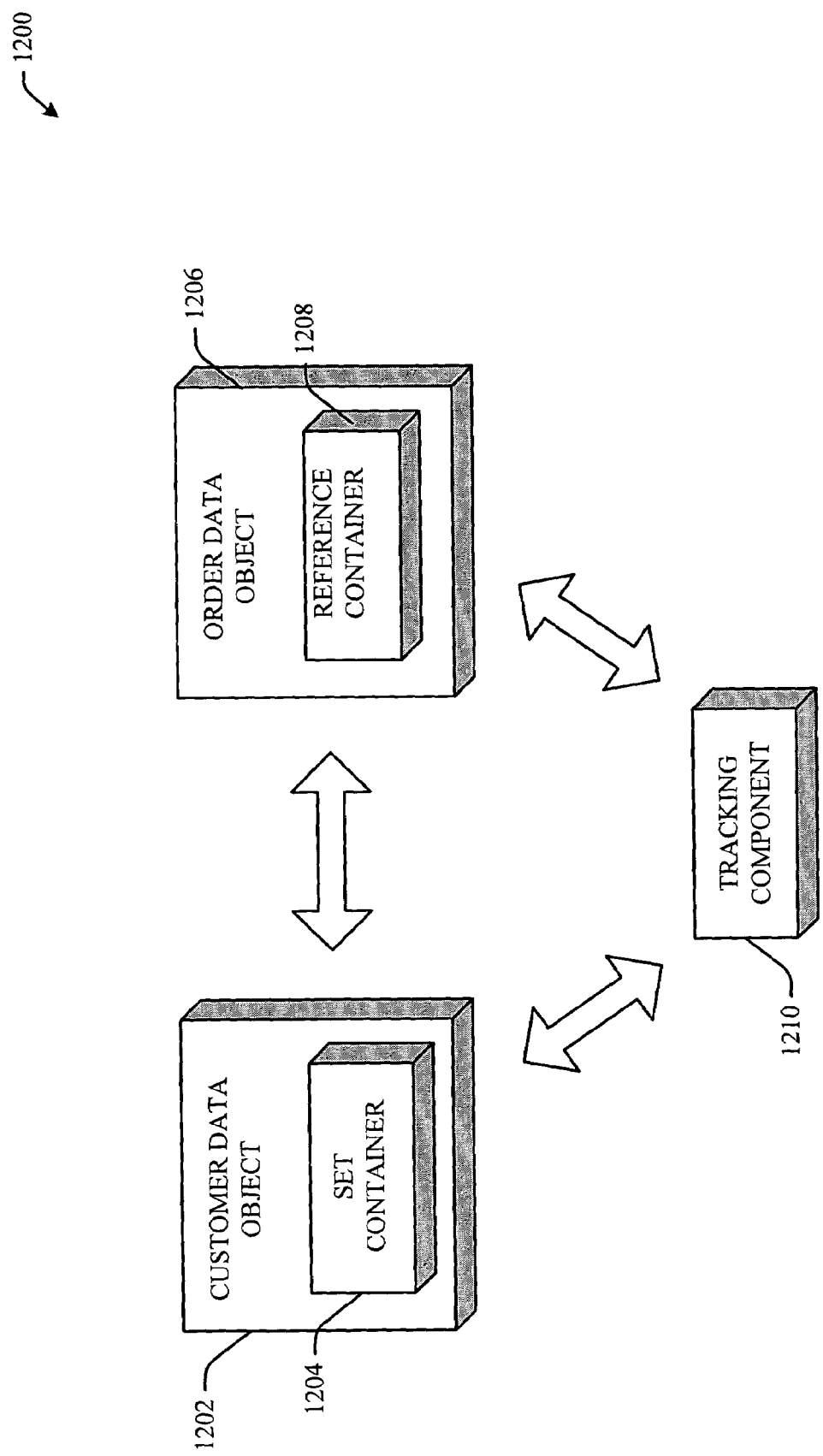
FIG. 12 is a block diagram that illustrates a customer order relationship example.

FIG. 12 is a block diagram that illustrates a customer order relationship example 1200, wherein a customer data object 1202 can have a set container 1204 that includes object information corresponding to the order data object 1206. Similarly, the order data object 1206 can have a reference container 1208 that includes object information corresponding to the customer data object 1202. A change to the object information contained in set container 1204 can cause a notification to be sent to the order data object 1206. Similarly, a change to the object information contained in reference container 1208 can cause a notification to be sent to the customer data object 1202. Moreover, as illustrated in FIG. 12, a tracking component 1210 can incrementally creates the list of changed objects.

According to a further aspect of the subject innovation, the tracking component 1210 can detect changes as they occur, and only a copy of the objects that have changed can be created. Such can provide an optimization algorithm to optimize a space and time required for detecting changes to objects and maintaining original values. Additionally, the corresponding comparison work can be significantly reduced.

Figure 13:
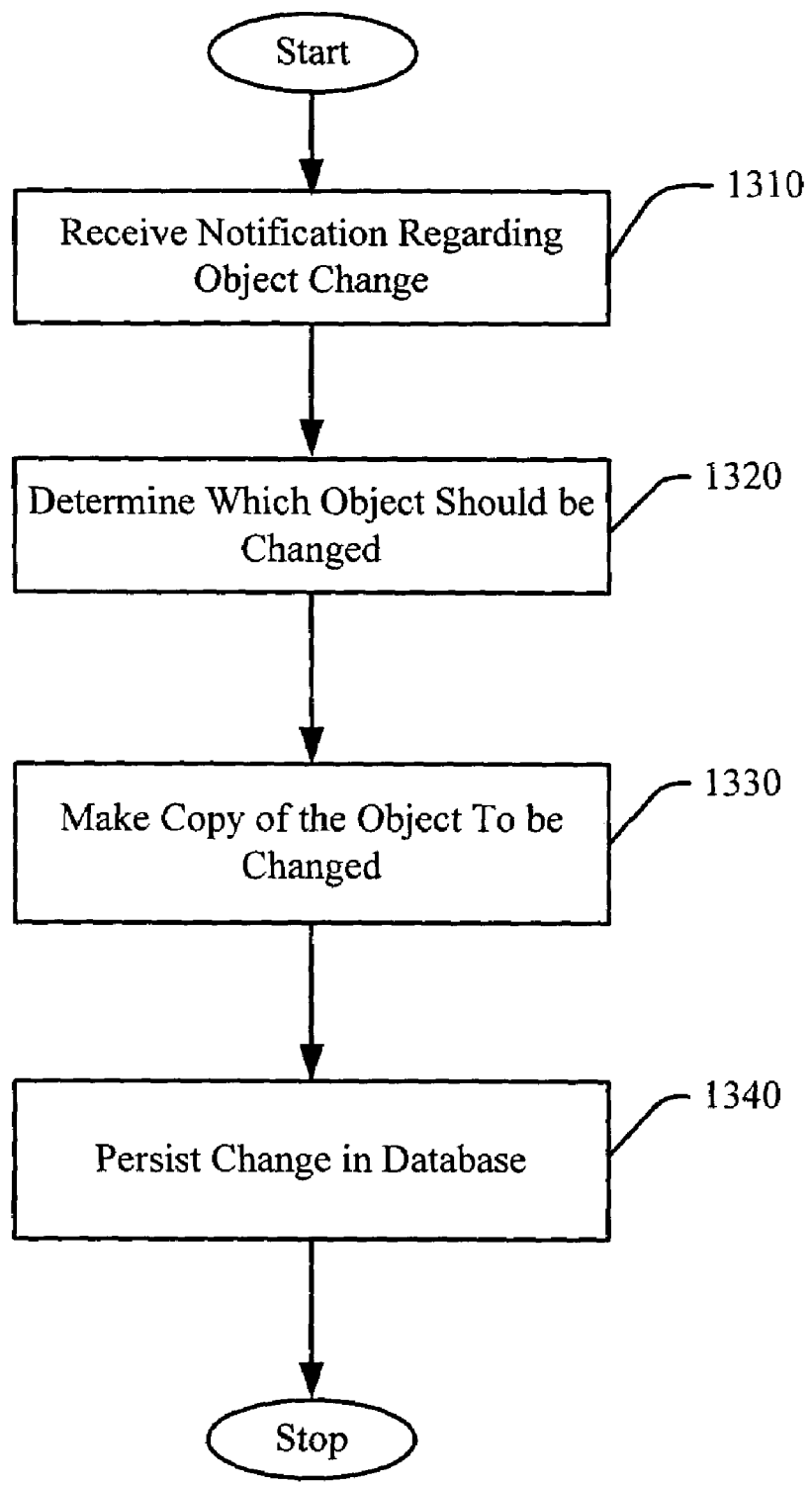
FIG. 13 illustrates a flowchart of tracking optimization for changed objects.

FIG. 13 illustrates a flowchart of track for changed objects, to optimize operation. Initially and at 1310, a notification is received regarding an object change in accordance with an aspect of the subject innovation. At 1320, a determination is made regarding the object to be changed. At 1330 a copy of the object to be changed is made. Subsequently, and at 1340 changes on the changed object are persisted back into the database. As such, the associated graph need not be recursively walked through, since the changed objects are known.

Algorithm for Computing Change Set

The following API methods can be used to describe the object persistence algorithm used for submitting changes. A developer can change a number of persistent objects by modifying or deleting retrieved objects and creating new persistent objects. Such results in Create, Update and Delete (collectively referred to using the acronym CUD) operations.

```
Employees.Add(e1);        // Adds Employee entity e1 for eventual
                          insertion into virtual table Employees which represents
                          EmployeeTable in the database
Employees.Remove(e2)      // Removes Employee entity e2 from
                          virtual table Employees which represents EmployeeTable in the
                          database
SubmitChanges( );         // Persist the changes to database
```

The following illustrates CUD operations presented to the developer using the framework of the subject innovation:

```
Create a new entity
Table.Add(e)              // no original created - wait for
SubmitChanges( ) time since e can be modified after this call
Update a retrieved entity
Table.TrackChanges(e);    // copies e, marks for update
e.Property1 = ...
e.Property2 = ...
Delete a retrieved entity
Table.Remove(e);          // Nulls out all entity refs in e and
marks e for deletion
```

Add( ) and Remove( ) eventually result in insert/delete operations that are deferred until SubmitChanges( ) is executed.

Currently, SubmitChanges( ) does the following:

```
Tracked ::= Add(e)
          | TrackChanges(e)
```

Transitively for each tracked entity
Find and mark "tracked" entities that are referenced, and
Discover new entities added.

New top level entities in general must be marked for insertion while the non-top level, new entities are automatically discovered and do not have to be marked.

Such two-pronged approach is implemented in part for the following reasons:

1. Chain of new objects: a new Employee is created for a newly created Division, both can be handled easily with one call. (This can exist as an additional convenience, but is not required.)

2. Sometimes, a variable name may not be present to use in a call; e.g. there is no variable name for an order as in the following example:

```
var div1 = new Division{
Name = "...";
Employees = {
new Employee { ... },
new Employee { ... }
}
};
Divisions.Add(div1);        // Add to the virtual table
```

Addition to collection is inferred as described above, but if a member of the collection is removed, the object persistence infrastructure is notified by the generated code (or must be typically notified by the programmer's code). So if an employee is removed from div1.Employees where div1 is a Division, TrackChanges(div1) must typically be called before the modification.

Transparent Transaction Model

Transaction support is a key aspect of an object persistence infrastructure. Existing ORM implementations often provide an API for creating and committing/rolling back a transaction. While providing transactional capability, the API makes it more difficult to use with other, non-ORM transactions (e.g., lower level, relational transaction APIs). The subject innovation addresses such complexities as follows:

1. If a transaction is created by a programmer using some other API, it can be executed in the context of the transaction.

2. Otherwise, the object persistence infrastructure automatically starts a transaction on the programmer's behalf. It executes the insert/update/delete SQL in the context of the newly created transaction and then commits or rolls back the transaction as appropriate.

The first approach can be integrated with an API as described below, wherein "op" refers to the object representing the object persistence implementation.

```
using (TransactionScope ts = new ..) {
    ...
    // Some transactional activity not performed by object persistence infrastructure
    cmd.ExecuteReader( );
    // Object persistence infrastructure uses the same transaction - transparently
    op.SubmitChanges( );
    ...
    ts.Complete( );
}
```

Figure 14:
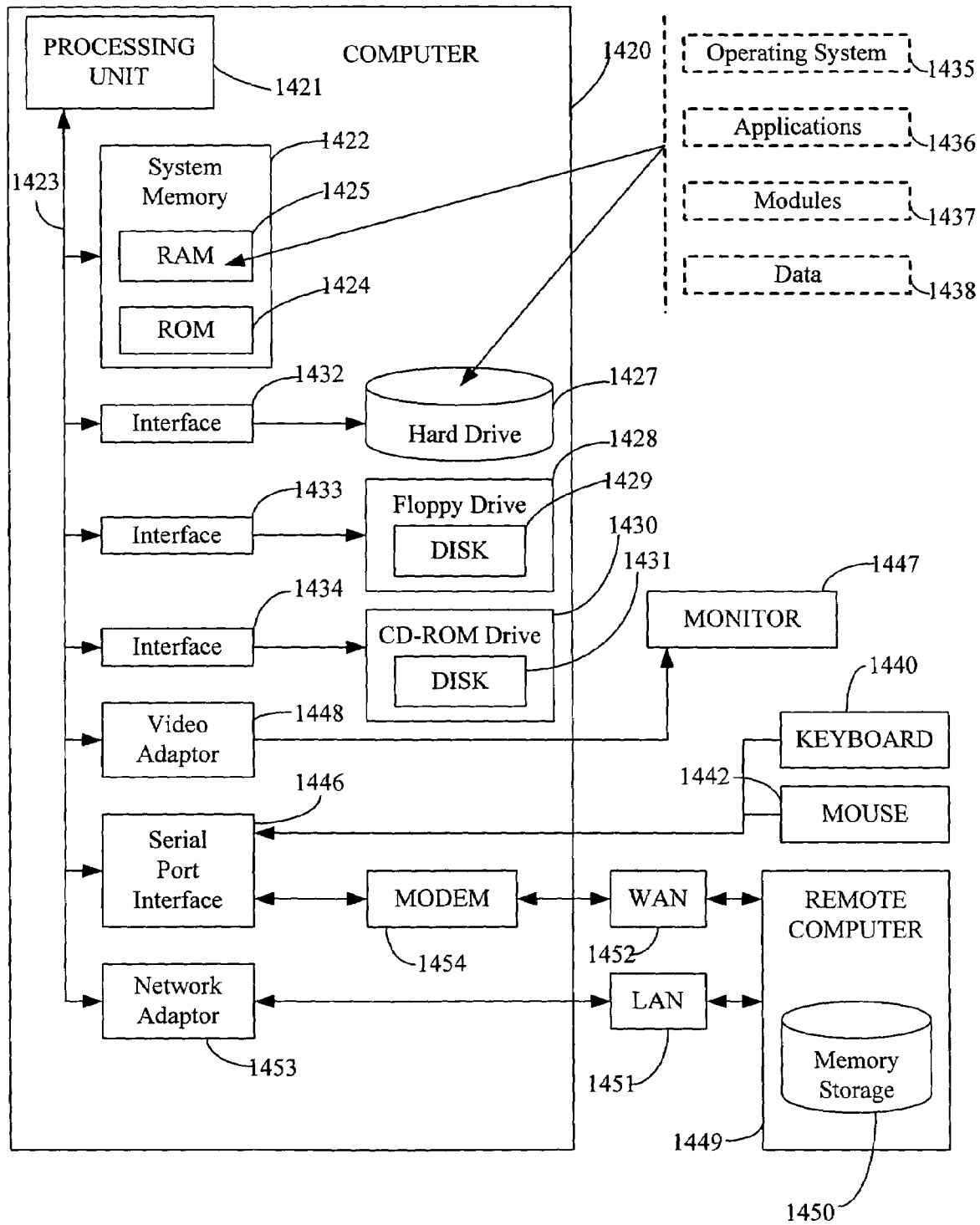
FIG. 14 illustrates a brief, general description of a suitable computing environment, wherein the various aspects of the subject innovation can be implemented.

Referring now to FIG. 14, a brief, general description of a suitable computing environment is illustrated wherein the various aspects of the subject innovation can be implemented. While the innovation has been described above in the general context of computer-executable instructions of a computer program that runs on a computer and/or computers, those skilled in the art will recognize that the innovation can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the innovation can also be practiced in distributed computing environments where tasks are performed by remote processing devices that are linked through a communications network. However, some, if not all aspects of the innovation can be practiced on stand-alone computers. In a distributed computing environment, program modules can be located in both local and remote memory storage devices. The exemplary environment includes a computer 1420, including a processing unit 1421, a system memory 1422, and a system bus 1423 that couples various system components including the system memory to the processing unit 1421. The processing unit 1421 can be any of various commercially available processors. Dual microprocessors and other multi-processor architectures also can be used as the processing unit 1421.

The system bus can be any of several types of bus structure including a USB, 1394, a peripheral bus, and a local bus using any of a variety of commercially available bus architectures. The system memory may include read only memory (ROM) 1424 and random access memory (RAM) 1425. A basic input/output system (BIOS), containing the basic routines that help to transfer information between elements within the computer 1420, such as during start-up, is stored in ROM 1424.

The computer 1420 further includes a hard disk drive 1427, a magnetic disk drive 1428, e.g., to read from or write to a removable disk 1429, and an optical disk drive 1430, e.g., for reading from or writing to a CD-ROM disk 1431 or to read from or write to other optical media. The hard disk drive 1427, magnetic disk drive 1428, and optical disk drive 1430 are connected to the system bus 1423 by a hard disk drive interface 1432, a magnetic disk drive interface 1433, and an optical drive interface 1434, respectively. The drives and their associated computer-readable media provide nonvolatile storage of data, data structures, computer-executable instructions, etc. for the computer 1420. Although the description of computer-readable storage media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject innovation. A number of program modules can be stored in the drives and RAM 1425, including an operating system 1435, one or more application programs 1436, other program modules 1437, and program data 1438. The operating system 1435 in the illustrated computer can be substantially any commercially available operating system.

A user can enter commands and information into the computer 1420 through a keyboard 1440 and a pointing device, such as a mouse 1442. Other input devices (not shown) can include a microphone, a joystick, a game pad, a satellite dish, a scanner, or the like. These and other input devices are often connected to the processing unit 1421 through a serial port interface 1446 that is coupled to the system bus, but may be connected by other interfaces, such as a parallel port, a game port or a universal serial bus (USB). A monitor 1447 or other type of display device is also connected to the system bus 1423 via an interface, such as a video adapter 1448. In addition to the monitor, computers typically include other peripheral output devices (not shown), such as speakers and printers.

The computer 1420 can operate in a networked environment using logical connections to one or more remote computers, such as a remote computer 1449. The remote computer 1449 may be a workstation, a server computer, a router, a peer device or other common network node, and typically includes many or all of the elements described relative to the computer 1420, although only a memory storage device 1450 is illustrated in FIG. 14. The logical connections depicted in FIG. 14 may include a local area network (LAN) 1451 and a wide area network (WAN) 1452. Such networking environments are commonplace in offices, enterprise-wide computer networks, Intranets and the Internet.

When employed in a LAN networking environment, the computer 1420 can be connected to the local network 1451 through a network interface or adapter 1453. When utilized in a WAN networking environment, the computer 1420 generally can include a modem 1454, and/or is connected to a communications server on the LAN, and/or has other means for establishing communications over the wide area network 1452, such as the Internet. The modem 1454, which can be internal or external, can be connected to the system bus 1423 via the serial port interface 1446. In a networked environment, program modules depicted relative to the computer 1420, or portions thereof, can be stored in the remote memory storage device. It will be appreciated that the network connections shown are exemplary and other means of establishing a communications link between the computers can be employed.

In accordance with the practices of persons skilled in the art of computer programming, the subject innovation has been described with reference to acts and symbolic representations of operations that are performed by a computer, such as the computer 1420, unless otherwise indicated. Such acts and operations are sometimes referred to as being computer-executed. It will be appreciated that the acts and symbolically represented operations include the manipulation by the processing unit 1421 of electrical signals representing data bits which causes a resulting transformation or reduction of the electrical signal representation, and the maintenance of data bits at memory locations in the memory system (including the system memory 1422, hard drive 1427, floppy disks 1429, and CD-ROM 1431) to thereby reconfigure or otherwise alter the computer system's operation, as well as other processing of signals. The memory locations wherein such data bits are maintained are physical locations that have particular electrical, magnetic, or optical properties corresponding to the data bits.

Figure 15:
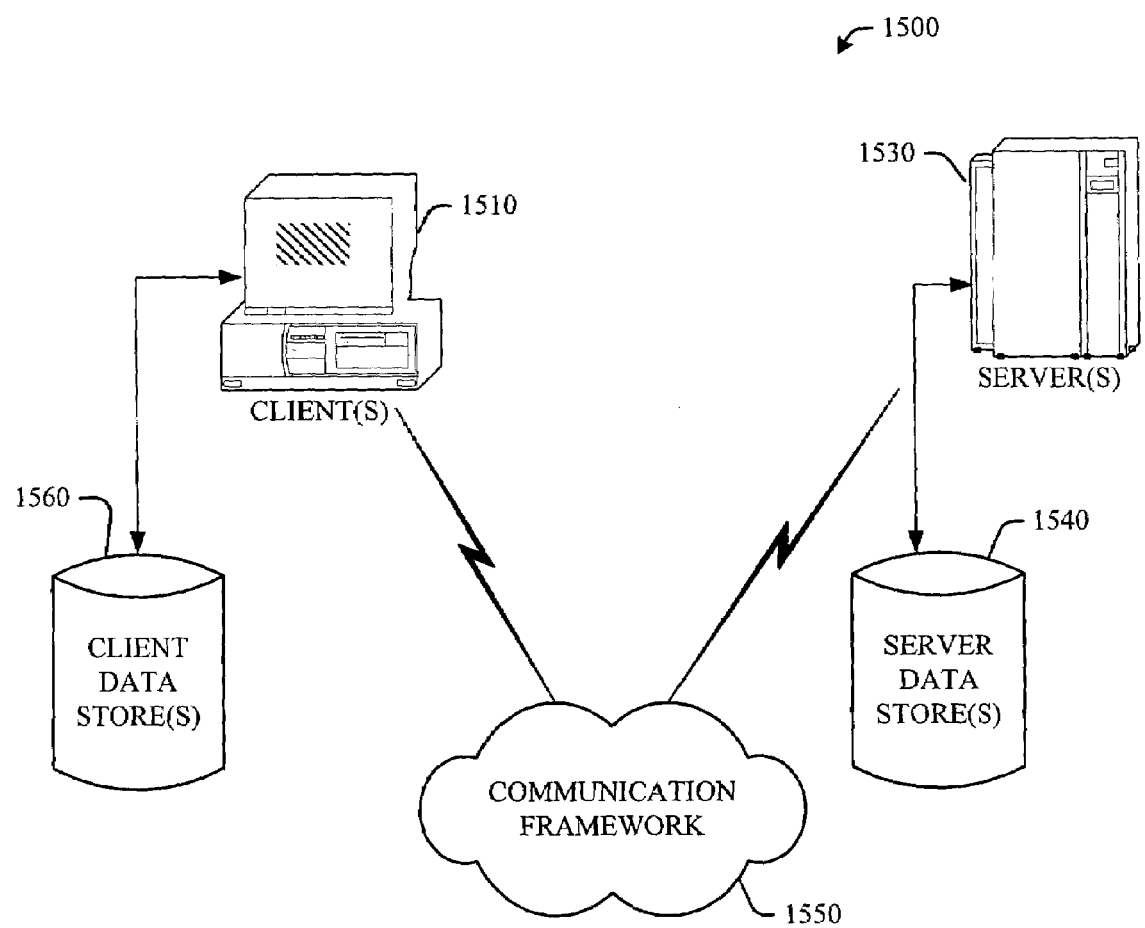
FIG. 15 illustrates a client-server system that can employ object fidelity via the entity set entity ref arrangement of the subject innovation.

FIG. 15 illustrates a client-server system 1500 that can employ the entity set, entity ref arrangement of the subject innovation. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the subject innovation, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, and the like), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable storage medium having computer-executable instructions for performing the acts and/or events of the various methods of the innovation. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates object relational mapping, the system comprising:
   one or more processors;
   memory;
   a database embodied on a computer-readable storage medium, the database including a first table and a second table, the first table configured to store data that represents entities of a first entity type, the second table configured to store data that represents entities of a second entity type, the first table configured to store a primary key for each entity of the first entity type, the second table configured to store a primary key for each entity of the second entity type, the second table configured to store a foreign key for each entity of the second entity type, each foreign key being bound to a primary key in the first table as part of a database constraint;
   computer-executable instructions embodied on a computer-readable storage medium that when executed on the one or more processors performs a consistent navigation method that facilitates bi-directional relationship between the memory and the database, the method including:
      retrieving first data from the first table of the database, the first data representing a first entity of the first entity type, the first data including a primary key that uniquely identifies the first entity;
      retrieving second data from the second table of the database, the second data representing a plurality of entities of the second entity type, the second data including a foreign key that corresponds to the primary key of the first data;
      implementing, in the memory, a set data object, the set data object encapsulating a portion of the first data that corresponds to the first entity of the first entity type;
      implementing, in the memory, a plurality of entity data objects, each of the plurality of entity data objects encapsulating a portion of the second data that corresponds to one of the plurality of entities of the second entity type;

in response to the second data including the foreign key that corresponds to the primary key of the first data, encapsulating, within each entity data object, a pointer to the set data object in the memory;

in response to the second data including the foreign key that corresponds to the primary key of the first data, encapsulating, within the set data object, at least one pointer to the entity data objects;

a tracking component that detects a change to the set data object and creates a copy of a set data object's state prior to the change when the set data object's state has not been copied previously; and wherein the set data object and the plurality of entity data objects provide object graph fidelity between an object loaded into the memory and a persistent representation of the object in a database side via constraints on collections of persistent objects, the constraints including at least preventing updates on the collection of persistent objects when the collection fails to completely load into memory.

2. The system of claim 1 further comprising an interesting object table that supply knowledge for roots of objects to the system.

3. The system of claim 2, further comprising a state associated with an object in the interesting object table that signifies a modification to be performed on the object.

4. The system of claim 3, wherein the modification is at least one of a deletion, insertion or update of objects.

5. The system of claim 4, further comprising an optimization feature that mitigates a requirement for a recursive walk through an object graph when the object is to be changed.

6. A method of managing object relational mapping, the method comprising:

providing a database that includes a first table and a second table, the first table configured to store data that represents entities of a first entity type, the second table configured to store data that represents entities of a second entity type, the first table configured to store a primary key for each entity of the first entity type, the second table configured to store a primary key for each entity of the second entity type, the second table configured to store a foreign key for each entity of the second entity type, each foreign key being bound to a primary key in the first table as part of a database constraint;

by using a computer including one or more processors and a memory:

retrieving first data from the first table of the database, the first data representing a first entity of the first entity type, the first data including a primary key that uniquely identifies the first entity;

retrieving second data from the second table of the database, the second data representing a plurality of entities of the second entity type, the second data including a foreign key that corresponds to the primary key of the first data;

implementing, in the memory, a set data object, the set data object encapsulating a portion of the first data that corresponds to the first entity of the first entity type;

implementing, in the memory, a plurality of entity data objects, each of the plurality of entity data objects encapsulating a portion of the second data that corresponds to one of the plurality of entities of the second entity type;

in response to the second data including the foreign key that corresponds to the primary key of the first data, the processor encapsulating, within each entity data object, a pointer to the set data object in memory;

in response to the second data including the foreign key that corresponds to the primary key of the first data, the processor encapsulating, within the set data object, at least one pointer to the entity data objects;

detecting a change to the set data object;

creating a copy of a set data object's state prior to the change when the set data object's state has not been copied previously; and wherein the set data object and the plurality of entity data objects provide object graph fidelity between an object loaded into the memory and a persistent representation of the object in a database side via constraints on collections of persistent objects, the constraints including at least preventing updates on the collection of persistent objects when the collection fails to completely load into the memory.

7. The method of claim 6, further comprising modifying the copy of the first entity data object via at least one of an update and deletion.

8. The method of claim 7, further comprising supplying a table of interesting objects that include a state for the first entity data object.

9. The method of claim 7, further comprising supplying a notification for an object that is to be changed.

10. The method of claim 7, further comprising copying only the first entity data object that is to be changed for a subsequent comparing act.

11. The method of claim 7, further comprising deleting items associated with the first entity data object upon deletion of the first entity data object.

12. The method of claim 7, further comprising maintaining object identity.

13. The method of claim 7, wherein the second data is retrieved via one of lazy loading or eager loading.

14. The method of claim 7, further comprising persisting the copy of the first entity data object into the database.

15. The method of claim 7, further comprising transparent transaction mapping via one of an execution in context of a transaction or automatically starting a transaction on a programmer's behalf.

16. A computer program product stored in a computer readable storage media for use at a computer system that facilitates object relational mapping, the computer program product having computer-executable instructions that, when executed at a processor, cause the computer system to perform steps of:

providing a database the includes a first table and a second table, the first table configured to store data that represents entities of a first entity type, the second table configured to store data that represents entities of a second entity type, the first table configured to store a primary key for each entity of the first entity type, the second table configured to store a primary key for each entity of the second entity type, the second table configured to store a foreign key for each entity of the second entity type, each foreign key being bound to a primary key in the first table as part of a database constraint:

retrieve first data from the first table of the database, the first data representing a first entity of the first entity type, the first data including a primary key that uniquely identifies the first entity;

retrieve second data from the second table of the database, the second data representing a plurality of entities of the second entity type, the second data including a foreign key that corresponds to the primary key of the first data;

implement, in memory, a set data object, the set data object encapsulating a portion of the first data that corresponds to the first entity of the first entity type;

implement, in the memory, a plurality of entity data objects, each of the plurality of entity data objects encapsulating a portion of the second data that corresponds to one of the plurality of entities of the second entity type;

in response to the second data including the foreign key that corresponds to the primary key of the first data, the processor encapsulating, within each entity data object, a pointer to the set data object in memory;

in response to the second data including the foreign key that corresponds to the primary key of the first data, the processor encapsulating, within the set data object, at least one pointer to the entity data objects;

detecting a change to the set data object;

creating a copy of a set data object's state prior to the change when the set data object's state has not been copied previously; and wherein the set data object and the plurality of entity data objects provide object graph fidelity between an object loaded into the memory and a persistent representation of the object in a database side via constraints on collections of persistent objects, the constraints including at least preventing updates on the collection of persistent objects when the collection fails to completely load into the memory.

* * * * *

UNITED STATES PATENT AND TRADEMARK OFFICE
CERTIFICATE OF CORRECTION

| | | |
|---|---|---|
| PATENT NO. | : 7,702,686 B2 | Page 1 of 1 |
| APPLICATION NO. | : 11/193574 | |
| DATED | : April 20, 2010 | |
| INVENTOR(S) | : Henricus Johannes Maria Meijer et al. | |

It is certified that error appears in the above-identified patent and that said Letters Patent is hereby corrected as shown below:

In column 18, line 61, in Claim 16, delete "constraint:" and insert -- constraint; --, therefor.

Signed and Sealed this
Twenty-second Day of February, 2011

David J. Kappos
*Director of the United States Patent and Trademark Office*